Feb. 16, 1926. Re. 16,270

T. W. VARLEY

ELECTRIC PYROMETER

Original Filed Jan. 15, 1918

WITNESSES:

R. J. Fitzgerald

J. A. Foster

INVENTOR

Thomas W. Varley.

BY

Wesley G. Carr

ATTORNEY

Reissued Feb. 16, 1926. Re. 16,270

UNITED STATES PATENT OFFICE.

THOMAS W. VARLEY, OF NEW YORK, N. Y.

ELECTRIC PYROMETER.

Original No. 1,375,872, dated April 26, 1921, Serial No. 211,959, filed January 15, 1918. Application for reissue filed February 16, 1922. Serial No. 537,067.

*To all whom it may concern:*

Be it known that I, THOMAS W. VARLEY, a citizen of the United States, residing at New York, in the county of New York and State of New York, have invented new and useful Improvements in Electric Pyrometers, of which the following is a specification.

This invention relates to a method of and means for indicating or measuring variable potentials which involve the balancing of a known or indicated drop of potential against the potential to be measured and which is for use in connection with pyrometer systems wherein a thermocouple is exposed to the temperature to be measured, the electromotive force thereby generated in the couple being a measure of the temperature and indications being produced by balancing methods as before referred to. The invention also may be applied to other uses which do not involve pyrometer or thermocouples.

The main object of the invention is to provide an improved method and means of the character indicated for measuring variable potentials.

A further object of the invention is to provide an improved pyrometer system; and other and ancillary objects of the invention will appear hereinafter.

In the accompanying drawings which illustrate the invention, Figure 1 is a diagram showing the connections and arrangement of the apparatus of a pyrometer system embodying the invention.

Figure 1:
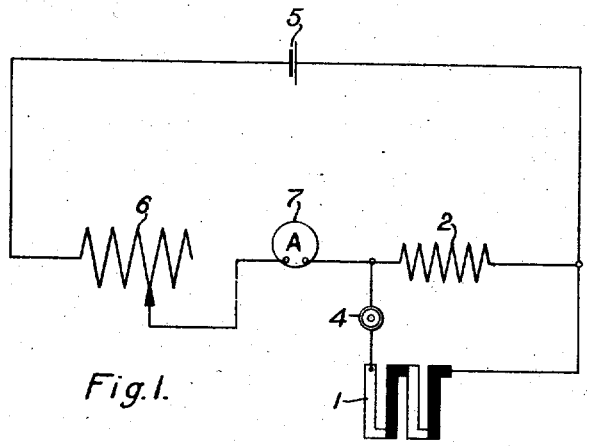

Referring to the drawings, and first to Fig. 1, a thermocouple 1, is suitably mounted in a furnace or other location where the temperature is desired to be measured. This thermocouple is connected in a shunt to a resistance 2, the opening and closing of the shunt being controlled by a push button 4. A suitable source of current such as a battery 5 has one terminal connected through a variable resistance 6 and a current-responsive instrument 7, such as an ammeter, with the junction of the circuit branches containing the resistance 2 and the thermocouple. The other junction of these branches is connected to the other terminal of the source 5. It will be observed that the ammeter 7 carries the current through the branch containing the thermocouple and also through the resistance 2. A change of current through either of these branches will therefore affect the total amount of current passing through the ammeter 7 and therefore affect its indication. The resistance 2 being fixed, the drop of potential across it will be proportional to the current flowing in it. This current can be made any that is desired by varying the resistance 6. If at any time, the electromotive force of the thermocouple 1 is equal to the drop of potential across the branch containing the resistance 2 and it being understood that the thermocouple is so connected that its potential will be opposed in the shunt to that of the source 5, then no current will tend to flow through the thermocouple, because its electromotive force will be balanced against the drop in the branch containing the resistance 2. At such a time, the opening or closing of the push button 4 will cause no change in the current through the ammeter 7, so that its needle will not be affected by such opening or closing. At such time, therefore, the voltage drop across the resistance 2 will be equal to the electromotive force of the thermocouple, which is the measure of the temperature, but when no current is flowing in the branch containing the thermocouple, the current in the ammeter 7 is proportional to the drop across the branch containing the resistance 2, consequently under such conditions, the reading of the ammeter 7 is a measure of the temperature and the ammeter may be calibrated to read in temperature instead of amperes.

The current traversing the measuring circuit, containing the meter 7 and the source 5, and the drop across the resistor 2 are functions of each other and bear the relation to each other that is set out in Ohm's law. If, therefore, any unknown electromotive force be applied to the resistor 2 and the current in the measuring circuit be varied until the drop across the resistor is equal to and opposing the applied electromotive force, the current then traversing the circuit will be proportional to, and a measure of, the applied electromotive force. The meter 7 may therefore be calibrated in amperes, volts or any other quantity of which the applied force is a function. Under such conditions of balance, the circuit of the thermocouple, or of the applied electromotive force, may be connected to, or disconnected from, the fixed resistor without affecting the current in any portion of the measuring circuit. No current, therefore, traverses the applied circuit under such conditions of balance.

In the practical operation of the apparatus therefore, the resistance 6 is varied and the push button 4 is opened and closed from time to time. When the adjustment of the resistance 6 is such that opening or closing of the push button 4 has no effect upon the indication of the ammeter, the condition of no current in the branch containing the thermocouple exists. The then reading of the instrument 7 is a measure of the temperature and, as before stated, this may be made to read directly in temperature.

Figure 2:
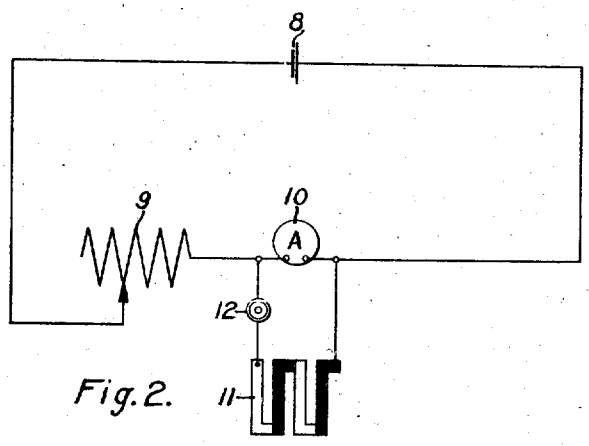
Fig. 2 is a similar view of a modified system.

Referring now to Fig. 2, the apparatus therein shown combines the resistance across which the thermocouple is shunted with the indicating instrument. Referring specifically to that figure, the battery or other source of electromotive force 8 has connected in series with it the variable resistance 9 and the current responsive indicating instrument 10. The instrument 10 includes a sufficient resistance to take the place of the resistance 2 of Fig. 1 and, like the resistance 2, preferably has a zero temperature coefficient so that its resistance will remain unchanged with variations in temperature from any cause. Connected in shunt to the instrument 10 is a thermocouple 11, the opening of the shunt being controlled by a push button 12. The practical operation of this apparatus is similar to that of the apparatus of Fig. 1. When the drop through the branch containing the instrument 10 is equal to the electromotive force of the thermocouple, there will be no current flowing in the branch containing the thermocouple and consequently the opening and closing of the shunt by the push button 12 will have no effect upon the reading of the instrument. If, however, the voltage drop in the branch containing the instrument 10 and the electromotive force of the thermocouple are unequal, a closing or opening of the push button 12 will cause a variation of the current flowing in the instrument 10 and a consequent movement of its needle. The operation of the apparatus therefore, like that of Fig. 1, is to vary the resistance 9 until opening and closing of the push button 12 will have no effect on the reading of the instrument 10. At such time the reading of the instrument will be a measure of the electromotive force of the thermocouple and therefore of the temperature to be measured.

Figure 3:
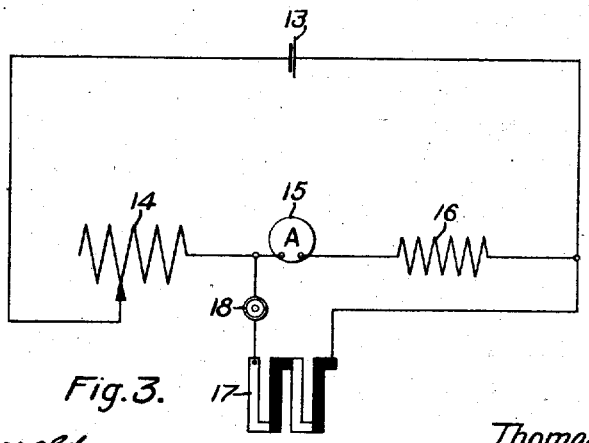
Fig. 3 is a similar view of another modification.

Referring now to Fig. 3, the indicating instrument is shown as being within the shunt circuit across the thermocouple, but a supplementary resistance is provided so that this supplementary resistance together with that of the instrument provides the desired resistance in shunt with the thermocouple. Thus, referring to Fig. 3 in detail, a source 13 of electromotive force has connected in series with it a variable resistance 14, a current responsive instrument 15 and a resistance 16. In multiple with the instrument 15 and the resistance 16 is connected the branch containing the thermocouple 17 which may be opened or closed by a push button 18. The operation of this apparatus is the same as that described in connection with Fig. 2 and, as before stated, the only difference is that instead of having all the resistance of the branch in shunt with the thermocouple included in the instrument, only a portion of this resistance is so included and the remainder is included in the supplementary resistance.

While the invention has been illustrated in what are considered its best applications, these do not exhaust the embodiments of the invention, which are not, therefore, limited to the structures shown in the drawings.

I claim as my invention:

1. The combination with a source of electro-motive force, of a resistor of fixed value, a variable resistor and a single current-responsive indicating instrument connected in series with said source, a shunt circuit connected to said first-mentioned resistor including a thermocouple and non-variable conductors for connecting the thermocouple to the terminals of the fixed resistor, and means for opening and closing the shunt circuit without varying the connecting conductors and without affecting the series connection of the resistors and the indicating instrument.

2. An electric pyrometer comprising a thermocouple, a resistor of fixed value, means for subjecting the same to the thermal electromotive force generated in the thermocouple, an auxiliary circuit including the resistor and a source of electrical energy, means for varying the current in the auxiliary circuit to cause the potential difference across the resistor to equal the thermal electromotive force, a current-indicating means in the auxiliary circuit and means for opening and closing the thermocouple circuit.

3. The method of ascertaining the value of unknown electromotive force which comprises successively connecting and disconnecting the unknown electromotive force to a resistor of fixed value, applying another source of electrical energy to the resistor, measuring the fluctuating current traversing said resistor and varying the current caused to traverse the resistor by such other source until a balance is indicated by the cessation of the fluctuations of current.

4. In a pyrometer, a measuring circuit comprising a resistor, an indicator for giving an indication proportional to a current, and a source of electrical energy, connected in series-circuit relation, a thermocouple to be subjected to a temperature to be measured, means for connecting it in parallel-circuit relation to said resistor, and circuit-closing means in the circuit of the thermocouple for varying the energization of the measuring circuit to permit the indicator to give an indication of the thermal electromotive force of the thermocouple and thereby the temperature thereof.

5. In a pyrometer, a measuring circuit comprising an indicator adapted to give an indication that is proportional to current, and a source of electrical energy connected in series-circuit relation to each other, a thermocouple to be subjected to a temperature to be measured, means for connecting it in parallel-circuit relation to a portion of said measuring circuit across which a drop of potential occurs, a single means for controlling the energization of the measuring circuit to obtain an indication of the thermal electromotive force of the thermocouple and thereby the temperature thereof and a circuit-closing device in the thermocouple circuit.

6. The combination with a source of electromotive force, of a fixed resistor, a current-indicating instrument, current-controlling means, said resistor, instrument, current-controlling means and source being connected in series relation, a shunt circuit connected to said resistor including a thermocouple and means for opening and closing said shunt circuit.

In testimony whereof, I have hereunto subscribed my name this 4 day of February, 1922.

THOMAS W. VARLEY.